March 21, 1967   S. P. JACKSON   3,310,728
REGULATED A.C.-D.C. CONVERTER SYSTEM
Filed July 11, 1962

INVENTOR
Stuart P. Jackson
By Anthony D. Cennamo
ATTORNEY

United States Patent Office 3,310,728
Patented Mar. 21, 1967

3,310,728
REGULATED A.C.-D.C. CONVERTER SYSTEM
Stuart P. Jackson, Columbus, Ohio, assignor to Solidstate Controls, Inc., a corporation of Ohio
Filed July 11, 1962, Ser. No. 209,064
4 Claims. (Cl. 321—18)

The present invention relates to electric regulating and limiting apparatus, and more particularly to apparatus for automatically regulating two interdependent electrical quantities as determined by the value of one of them, such as current and voltage in a load circuit.

It is often desirable to limit any one of a plurality of interdependent or related electrical or mechanical quantities to respective maximum values. Furthermore, it is often desirable to regulate one of these quantities to a constant value so long as the others are below their respective maximum values, and successively to transfer control as the other quantities reach their maximum values, so as to limit them to such values. As a two-quantity example, it is often desirable to maintain the current of an electric translating circuit, such as a series lighting circuit, constant over a given voltage range, while at the same time limiting maximum voltage in the circuit to a predetermined value.

In a prior system described in U.S. Patent 2,673,324, issued to Lester W. Burton, et al., a regulating controller is provided for each variable and transfer of control from one variable to the other is accomplished by means of selector relay. The present invention provides a system having a differential amplifier responsive to changes in two variables such as voltage and current to a load. The amplifier continuously compares these variables with a target value therefor and feeds back a correction to compensate for the change. The amplifier provides pulses to fire a controlled rectifier bridge circuit. The correction is applied electronically in a continuous dual control system having a loop gain determined by the differential amplifier utilized.

Accordingly, it is an object of the present invention to provide a "double clamp" circuit for automatically controlling two output variables.

It is another object of the present invention to provide a "double clamp" circuit which more accurately controls the output variables than similar devices used heretofore.

It is also an object of the present invention to provide a "double clamp" circuit which is simple to build and economical to maintain.

It is a further object of the present invention to provide a clamping circuit which can be easily modified to control more than two output variables without sacrificing any control accuracy.

Figure 1:
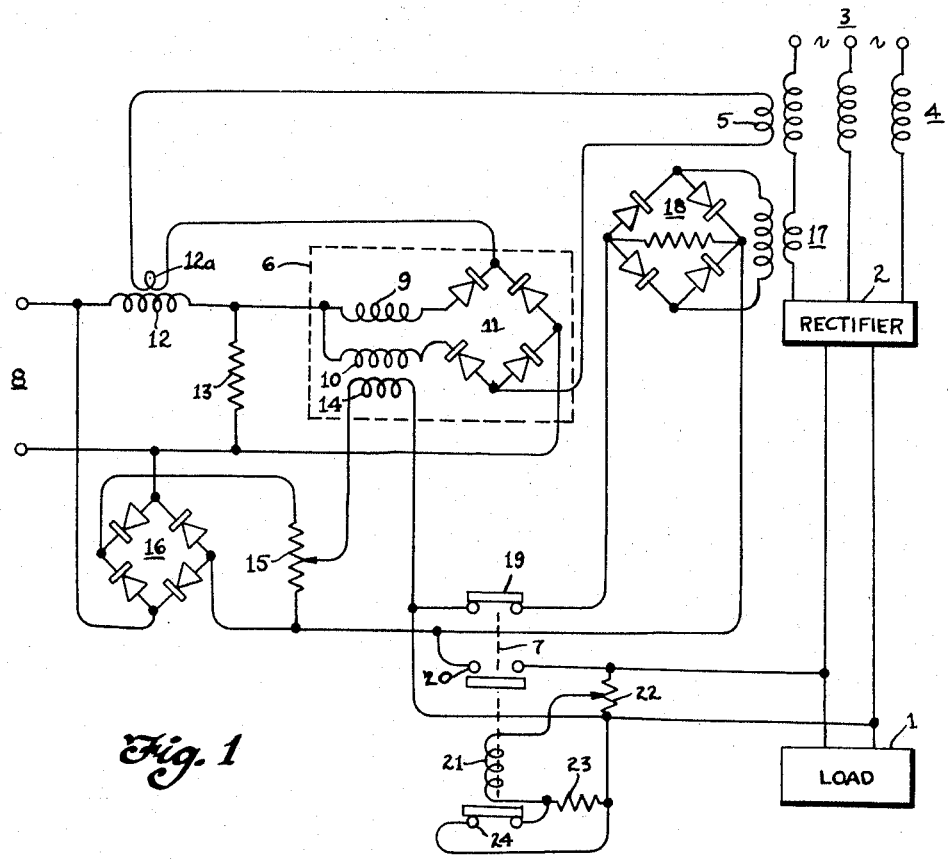
Figure 2:
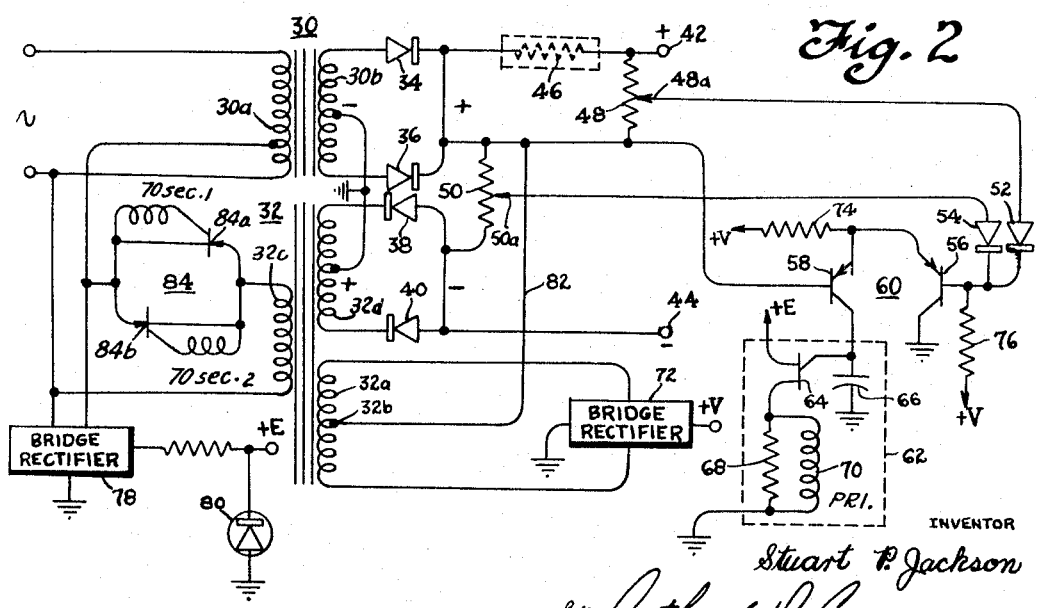

These and numerous other objects and advantages of the present invention will become more apparent upon reference to the following description when taken in conjunction with the drawings in which:

FIG. 1 is a schematic circuit diagram partly diagrammatic of a discontinuous double clamp control circuit useful in explaining the salient features of the present invention; and, FIG. 2 is a continuous double clamp controller constructed in accordance with the present invention.

The purpose and operation of the present invention are best explained by first examining the circuit shown in FIG. 1. This is a voltage-limited current regulating system including a direct current load circuit 1 supplied through a rectifier 2 from a three-phase alternating current supply including line conductors 3. In the line 3 in series with the rectifier 2 is connected a three-phase saturable core reactor 4 for controlling rectifier input voltage. It will, of course, be understood by those skilled in the art that the saturable core reactor 4, in controlling the rectifier input voltage, controls also the rectifier input and output current and the rectifier output or load voltage, assuming that the load remains unchanged.

The impedance of the saturable core reactor 4 is controlled by a direct current saturating winding 5 connected in the output circuit of a signal responsive device 6, the input signal to which is responsive either to line current or load voltage, depending upon the position of a transfer or selector relay 7.

I have shown the signal responsive device 6 as a single phase, self-saturating magnetic amplifier supplied from a constant voltage source of alternating electric current supply represented by a pair of line conductors 8. The amplifier comprises a pair of reactor windings 9 and 10, bridge-connected in parallel circuit relation with each other through opposite arms of a rectifier bridge 11 and the amplifier output circuit including the reactor saturating winding 5. To increase the gain of the magnetic amplifier 6, a saturable reactor 12 is connected in series circuit relation therewith in the alternating current supply line 8, and provided with a saturating winding 12a in the output circuit of the amplifier. In order to improve the operation of the amplifier 6, a bleeder resistor 13 is connected in parallel circuit relation with the amplifier across the alternating current supply line 8.

The input circuit of the magnetic amplifier 6 includes a single control winding 14 to which is supplied an adjustable reference signal voltage of constant value across a potentiometer 15 in differential relation with a selected signal voltage derived from the load circuit by means of the transfer relay 7. The reference signal voltage is established across the potentiometer 15 through a rectifier bridge 16, the input circuit of which is connected to the alternating current supply conductors 8 of fixed potential.

In series differential relation with the fixed reference signal voltage across the potentiometer 15, there is supplied in the amplifier input circuit a selected variable signal voltage proportional to either current or voltage in the load circuit 1. The current responsive signal voltage is derived from the alternating current line 3 through a current transformer 17 and a rectifier bridge 18, and supplied to the signal amplifier input circuit in series differential relation with the reference voltage across the potentiometer 15 through a normally closed contact 19 of the transfer relay 7. Similarly, the voltage responsive signal is derived from directly across the terminals of the load circuit 1, and supplied to the signal amplifier input circuit in differential relation with the reference voltage across the resistor 15 through a normally open contact 20 of the relay 17. It will, therefore, be evident that when the relay 7 is in its dropped-out position, a current responsive signal is supplied through the relay contact 19, and is compared with the reference signal, so that the output circuit of the amplifier controls the reactor saturating winding 5 to maintain the load circuit current constant. Similarly, when the relay 7 is in its picked-up position, a load voltage responsive signal is supplied to the signal amplifier input circuit and compared with the reference signal across the potentiometer 15, so that the amplifier output circuit controls the saturable reactor 4 to maintain load voltage constant.

The selector relay 7 is provided with an actuating winding 21 connected for response to the load voltage, in this case the limiting quantity, by connection of the actuating winding 21 across a portion of a potentiometer 22 connected across the terminals of the load 1. Connected in series circuit relation with the actuating winding 21, we provide a resistor 23 which is connected to be shunted by a normally closed contact 24 on the relay 7 when the relay is in its dropped-out position. Thus, it will be evident that upon the occurrence of a load voltage of a predetermined maximum value, the relay 7 picks up to transfer control of the amplifier 6 from the current signal supplied through the contact 19 to the voltage signal supplied through the contact 7. Upon pick-up of the relay 7, the actuating circuit of the relay is recalibrated by opening of the auxiliary contact 24, thereby to insert in series circuit relation with the actuating winding 21 the calibrating resistor 23. By insertion of this resistor 23, the signal voltage across the resistor 22 at which the relay 7 will drop out is increased, thereby decreasing the differential of the relay, so that the relay will not hold in on load voltages appreciably below the load voltage at which it picks up. It will, of course, be understood by those skilled in the art that the load voltage for dropout must be somewhat below the load voltage for pick-up to ensure stable operation, but that for accurate control the differential between these voltages may be reduced to substantially zero.

It will now be understood by those skilled in the art that, if it is desired to limit in response to the occurrence of a minimum load voltage, rather than a maximum load voltage, this may be done by converting the contact 19 to a normally open contact and the contact 20 to a normally closed contact, so that in operation the relay 7 normally remains picked-up. The same relay actuating circuit shown will serve to ensure a small differential between drop-out of the relay upon occurrence of a predetermined minimum load voltage and subsequent pick-up when the load voltage tends to rise again above the predetermined minimum value.

The present invention proposes a system for continuously controlling the transfer of regulation from one variable to the other. Specifically, the present invention provides continuous control of whichever variable is in the limiting range without regard to the value of the other variable. Therefore, the circuit can provide constant voltage with a current limit or constant current with a voltage limit depending only on the independent setting of the two limits and the inevitable variations in load requirement.

With reference now to FIG. 2, the system of the present invention comprises input transformers 30 and 32, having a plurality of primary and secondary windings denoted by lower case letters. Transformer 30 includes a tapped primary 30a and tapped secondary 30b. Transformer 32 is provided with a primary 32c, a first tapped secondary 32d, and a second tapped secondary 32a. Diodes 34–40 provide a D.C. potential across load terminals 42, 44, by means of two serially connected centertap rectifier circuits, according to the polarity indicated. The lumped resistance of the supply leads is shown as a low resistance 46. Current rate adjusting potentiometers 48, 50 are connected across the load terminals 42, 44.

The potentials existing on the potentiometer taps 48a and 50a are coupled via diodes 52, 54 into the base of one transistor 56 of a differential amplifier 60 in a common emitter configuration. To the collector of transistor 58 is connected a pulse forming network shown generally at 62 comprising an unijunction transistor 64, a capacitor 66, resistance 68 and coil 70 primary of transformer $70_{pri}$. The emitter supply potential for the differential amplifier 60 is provided by a full wave rectifying diode bridge 72 connected across a secondary winding 32a of transformer 32. An emitter load resistance and base biasing resistance are respectively designated with reference numerals 74, 76. Operating potential for the pulse forming network 64 is provided by another full wave bridge 78 tapped across the primary 30a of transformer 30. The D.C. potential supplied to the pulse forming network 62 is regulated by a zener diode 80.

To accomplish the differential action of amplifier 60, the base of transistor 58 is connected to the center tap 32b of secondary winding 32a by means of line 82. Line 82 is also connected to the supply side to the dropping load resistance 46 and comprises a reference point for the potentials existing at potentiometer taps 48a and 50a.

The secondary of transformer 70 i.e., $70_{sec1}$ and $70_{sec2}$, of network 84 isolate pulses which fire the controlled rectifiers 84a and 84b. The SCR's do not "fire" at the beginning of the half cycle of the supply voltage—they "fire" at a variable time delay determined by network comprising capacitor 66, unijunction transistors 64 and transistor 58. This time delay network varies the D.C. output of rectifiers 38 and 40. The output voltage of the rectifier supply is varied by varying the phase angle at which the silicon controlled rectifiers 84a and 84b are "fired." This phase angle is determined by the current flow through the collector of transistor 58 of the circuit 60.

In the operation of the circuit an upward shift in load current is reflected in an increased drop across potentiometer 48. The differential amplifier 60 causes the pulse forming network to provide a narrow line pulse which is fed back through transformer 70 causing the controlled rectifiers 34a and 84b to fire at a smaller angle, thereby reducing the available average current from diodes 38, 40 in this portion of the D.C. load supply loop. The tendency for the terminal voltage to drop is compensated by the feedback system and it is quickly reestablished at a desired value regardless of the current drain on the supply. As will be apparent to those skilled in the art, the circuit is also useful in compensating for changes in line voltage at the transformer primary terminals.

A typical application of the system described hereinabove may be as a constant potential battery charger wherein the terminal voltage and current value may be typically 31 volts and 87 amperes. In which case the potentiometer 48 functions as a high-rate current adjustment and the potentiometer functions as a finish rate current adjustment. It may be observed that other applications may readily be found.

Thus, while the present invention has been described in terms of a specific preferred embodiment, it should be understood that many additions, omissions or substitutions may be made therein without detracting from the original spirit and scope of the present invention or sacrificing any of its attendant advantages.

What is claimed is:

1. A D.C. supply comprising a first transformer having a primary and a secondary winding, a center tap on each of said windings, a control transformer having a primary winding and two center tapped secondary windings, a first pair of unidirectional devices having cathode electrodes commonly connected, means for connecting said first pair of unidirectional devices across said secondary of said first transformer, a second pair of unidirectional devices having anode elements commonly connected, means for connecting said second pair of unidirectional devices across one of said secondaries of said second transformer, said common connections defining a pair of output terminals, means connecting centertaps of said first transformer secondary and said one of said control transformer secondaries, a pair of potentiometers serially connected across said output terminals and having adjustable taps, biasing circuit means connected across said potentiometer taps for altering the average current through said second pair of unilateral devices, a plurality of varying nonlinear voltage-current sources connected to said biasing circuit means and means for varying one or more of said voltage current sources whereby an upward shift in load current across said last named means reduces the available average current through said D.C. supply.

2. The D.C. supply as set forth in claim 1 wherein said biasing circuit means comprises unidirectional devices, and wherein one of said sources is normally free running.

3. The D.C. supply as set forth in claim 1 further comprising means for connecting said center tap of said other control transformer secondary to said common junction of said potentiometers and wherein one of said sources is a bridge rectifier means connected across said other second secondary winding to provide operating potential for said biasing circuit.

4. The D.C. supply as set forth in claim 1 in which said unidirectional devices comprises semiconductor diodes.

References Cited by the Examiner

UNITED STATES PATENTS

| 2,972,097 | 2/1961 | Dornfhoefer | 321—18 |
| 3,018,432 | 1/1962 | Palmer | 323—66 |

OTHER REFERENCES

"General Electric Controlled Rectifier Manual," First edition, FIG. 7.11, pp. 95, copyright 3-21-60.

JOHN F. COUCH, *Primary Examiner.*

LLOYD McCOLLUM, MAX L. LEVY, *Examiners.*

J. M. THOMSON, W. E. RAY, *Assistant Examiners.*